United States Patent [19]

Wirt

[11] 4,303,144

[45] Dec. 1, 1981

[54] APPARATUS FOR THE RETROREFLECTION OF SOUND

[75] Inventor: Leslie S. Wirt, Newhall, Calif.

[73] Assignee: Lockheed Corporation, Burbank, Calif.

[21] Appl. No.: 106,237

[22] Filed: Dec. 21, 1979

[51] Int. Cl.³ .................. E04F 17/04; E04B 1/82; G10K 11/20

[52] U.S. Cl. .................... 181/288; 181/224; 181/292

[58] Field of Search ............ 181/198, 210, 213, 222, 181/224, 284, 288, 292; 52/144, 145

[56] References Cited

U.S. PATENT DOCUMENTS

| | | | |
|---|---|---|---|
| 2,549,189 | 4/1951 | Gabo | 52/144 X |
| 3,035,657 | 5/1962 | Lemon | 52/144 X |
| 3,593,819 | 7/1971 | Giraudeau | 181/288 |
| 4,094,379 | 6/1978 | Steinberger | 181/284 |
| 4,141,433 | 2/1979 | Warnaka | 181/292 X |

FOREIGN PATENT DOCUMENTS 2371846  7/1978  France .................. 181/284

Primary Examiner—L. T. Hix
Assistant Examiner—Thomas H. Tarcza
Attorney, Agent, or Firm—Frederic P. Smith

[57] ABSTRACT

A noise control device which relies upon retroreflection for sound attenuation. The device comprises an array of corner reflectors recessed into a surface and forming a sound retroreflecting panel. This cavitated surface provides the desired retroreflection of impinging sound waves so as to preclude undesirable onward propagation. The invention is particularly suitable for noise control applications in the presence of severe environmental conditions, and may also be used in combination with sound absorbing materials.

12 Claims, 8 Drawing Figures

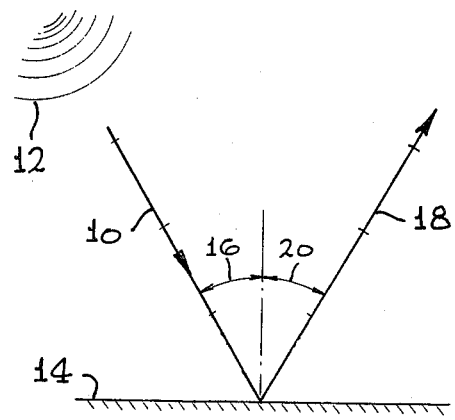
FIG. 1
PRIOR ART
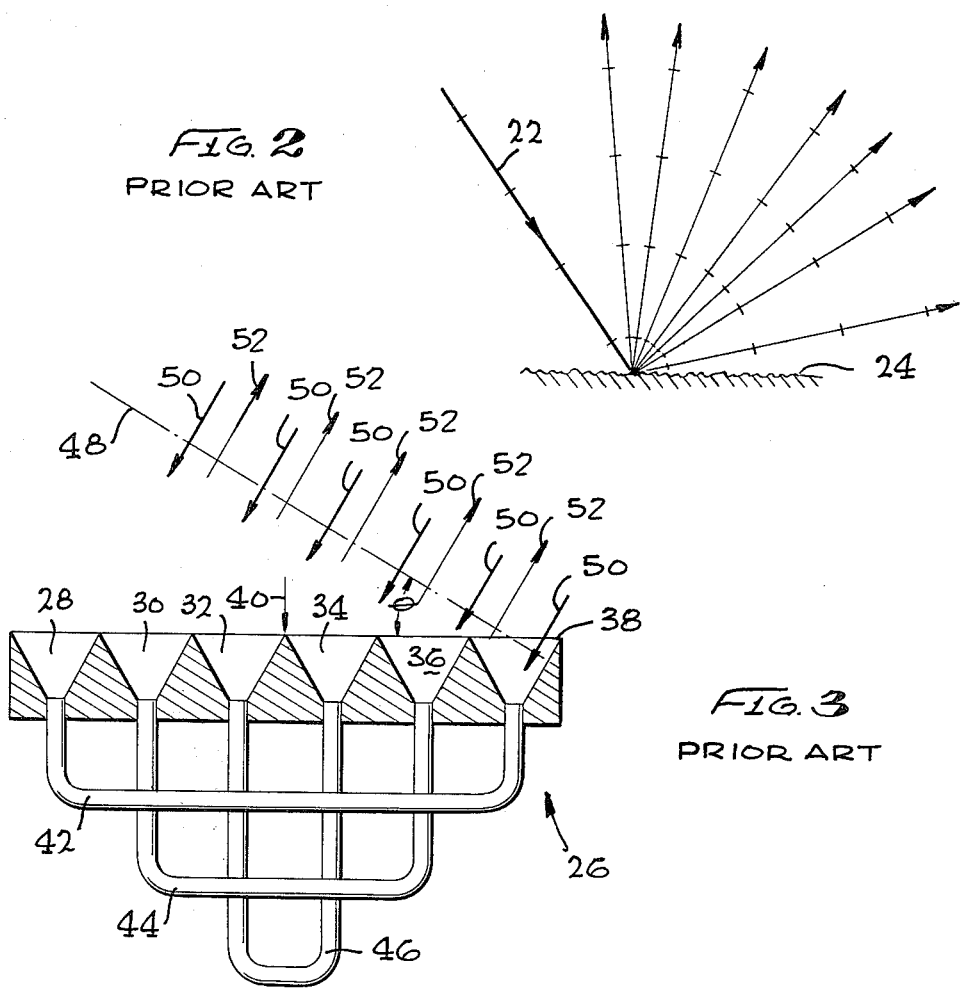
FIG. 2
PRIOR ART
FIG. 3
PRIOR ART

U.S. Patent  Dec. 1, 1981  Sheet 3 of 3  4,303,144
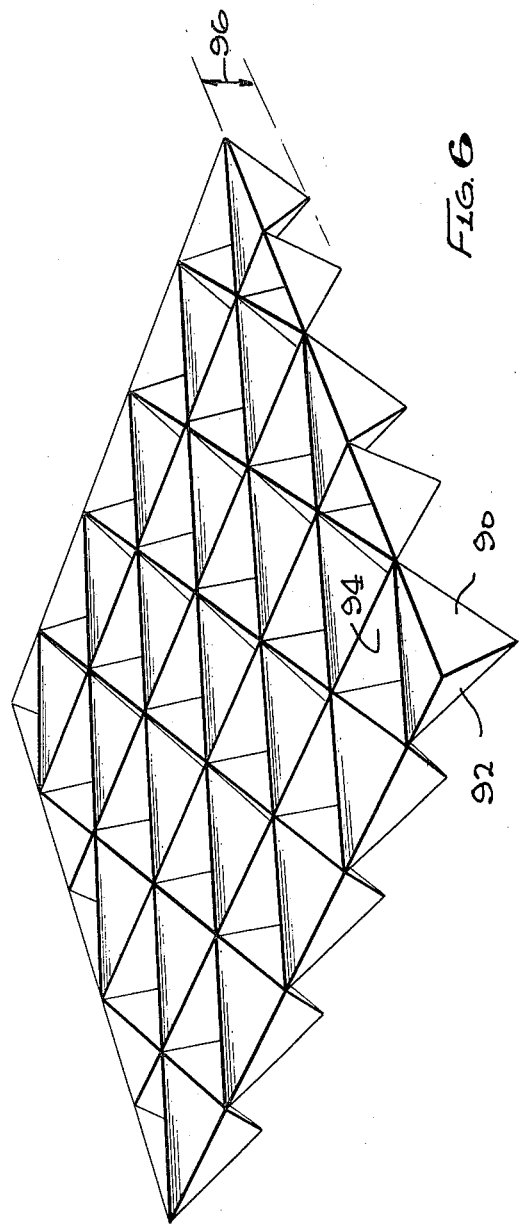
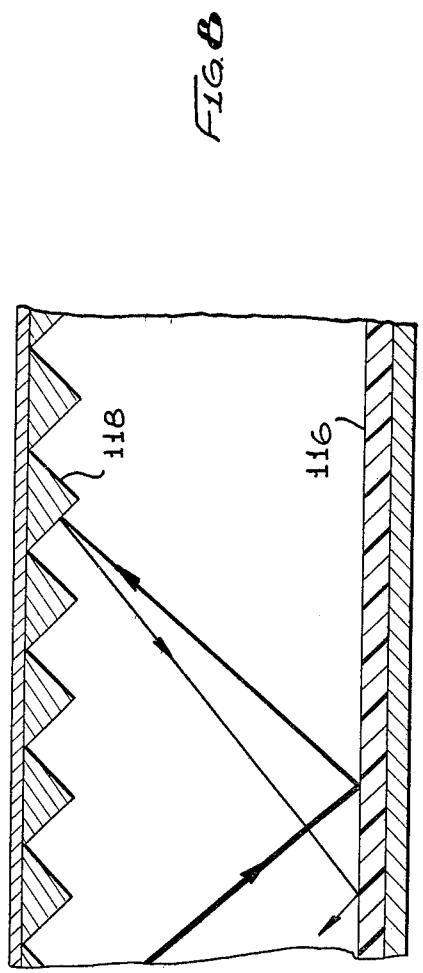

though imperfectly reflective, they none the less reflect a substantial portion of the incident sound. For smooth surfaces of large extent the reflection is substantially specular. That is, the angle of reflection is equal to the angle of incidence, as shown in FIG. 1. As the reflecting surface becomes less smooth (more irregular) the reflection becomes increasingly diffuse, as shown in FIG. 2. For highly irregular surfaces the reflected energy is strongly scattered, much as light is scattered by a piece of ground glass.

APPARATUS FOR THE RETROREFLECTION OF SOUND

TECHNICAL FIELD

The invention relates to the field of acoustics and more particularly to apparatus for the dissipation of broadband acoustic energy by controlled retroreflection.

BACKGROUND ART

Heretofore various devices have been employed for absorbing noise, most of which rely on the acoustical impedance properties of materials for the conversion of sound energy into thermal energy. Typical of these materials are bulk fibers, flow-resistive screens, and absorptive cellular structures. While these prior art materials are highly suitable for many applications, there are certain other applications which preclude their use for reasons related directly to the undesirable characteristics of the sound absorbing materials themselves. Specifically, sound absorbing materials generally have limited structural strength, tend to absorb or wick liquids, and frequently are combustible in nature.

To overcome certain of the shortcomings of the above-described bulk absorbers, specialized "resonant" absorbers have been proposed previously. These type of devices rely on the use of a plurality of closely-spaced tuned chambers or helmholtz resonators to absorb sound. Such arrays of resonators can be strongly absorbent in limited frequency ranges. A principal deterrent to the wide use of these resonant type of absorbers is, however, their high cost of manufacture.

Very often the propagation of sound from a source of noise to a listener or receiver occurs partly or mainly by one or more reflections. In the past it has been customary to attenuate such sound by applying sound absorptive material to the reflecting surfaces. While such attenuation is partially successful, it is obvious that the remainder of the unattenuated sound continues onward towards the receiver.

Accordingly it is a general object of the present invention to dissipate broadband acoustic energy.

It is yet another object of the present invention to dissipate broadband acoustic energy without relying on the use of sound absorbing materials.

It is a further object of the present invention to dissipate broadband acoustic energy without the use of an array of closely spaced tuned resonators.

DISCLOSURE OF INVENTION

The present invention relies on retroreflection of sound waves for the control of unwanted sound. By the term "retroflection" is meant the reflection of an incident wave back along its original path towards the source of the wave. Sound impinging upon a multiple reflector array is reflected generally back from whence it came instead of being reflected elsewhere in the normal manner. Sound which reaches a listener or receiver by a route involving one or more reflections may thus be impeded if the reflecting surface is retroreflective instead of normally reflective. That is, the unwanted sound is returned to its source rather than broadcast. The required shape or geometry of the multiple reflectors is such as to permit their ready fabrication by sheet metal stamping or casting, etc., resulting in a lower cost than the sound absorptive devices of the prior art. In a particular embodiment, the structure of the present invention comprises a panel having an array of corner reflectors recessed into the surface thereof in a nested repetitious pattern. This cavitated surface returns incoming sound waves back towards their origin for a wide range of angles of incidence. In this way the onward propagation of the unwanted sound is impeded or prevented.

A typical application of the invention is as a lining for an airconditioning duct in which case the sound of the motor-driven blower is caused to be returned towards the source by retroreflection rather than conducted through the duct to the outlet vent. Also, the invention is useful for high-intensity noise attenuation applications, such as for a fanjet engine inlet of discharge duct. The retroreflective panel may sometimes be used advantageously in conjunction with ordinary sound absorptive means. For example, sound absorption can be applied to one side of a duct and the retroreflective array to the other side. The net effect is a duct attenuation characteristic which is about the same as if both sides were absorptive.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of description only and are not intended as a definition of the limits of the invention.

BRIEF DESCRIPTION OF DRAWINGS

FIG. 1 is a diagrammatic illustration representing specular reflection, useful in the exposition of the invention;

FIG. 2 is a diagrammatic illustration showing random scattering;

FIG. 3 is an illustration of a Van Atta reflector of the prior art, useful in the exposition of the present invention;

FIG. 6 is a perspective view of a sound retroreflection panel constructed in accordance with the invention;

and FIG. 8 is a somewhat diagrammatic, cross-sectional, elevational view of another embodiment of the invention incorporating both a retroreflective liner and an absorbing liner, as incorporated into a flow duct.

BEST MODE FOR CARRYING OUT THE INVENTION

Figure 4:
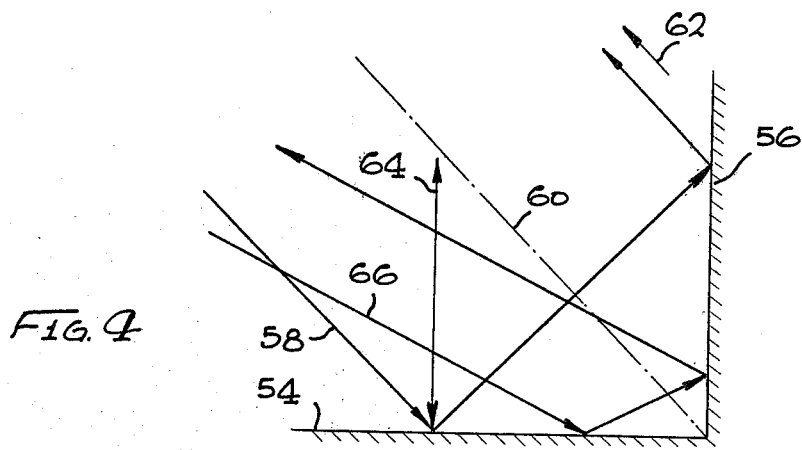
FIG. 4 is a diagrammatic illustration showing backscattering in a corner.

Heretofore little attention has been given to the retroreflective approach to the control of unwanted sound. True specular (mirrorlike) reflection of sound is in reality the exception rather than the rule. Ideally, such reflection occurs only if the reflecting surface is perfectly smooth, perfectly rigid and of infinite extent. Practical surfaces have a finite acoustical impedance;

therefore, a change usually occurs such that the reflected wave may either lead or lag the incident wave in phase. If the surface is smooth and of large extent relative to the wavelength of the sound, the angle of reflection will equal the angle of incidence, in either case. For a narrow range of values for the acoustic impedance, such a surface absorbs a relatively large percentage of the incident sound and is then known as a sound absorptive material.

The reflection of sound may be treated with rigor by very elaborate mathematical means. The process involved, however, may be much more readily visualized in terms of a single ray path model. Ray paths are commonly used to describe the propagation of sound. It is to be understood however that although a ray model represents the behavior of a high-frequency sound with fair accuracy, the accuracy diminishes as frequency is reduced such that at quite low frequencies the ray only represents a central tendency or general direction of the sound. Since the present invention is concerned mainly with relatively high-frequency sounds, the ray model is adequate for its description.

There is shown in FIG. 1 a ray path 10 from a sound source 12 impinging upon reflective surface 14 at an angle of incidence 16. The angle of reflection of ray path 18 is indicated at 20.

All reflections of sound described to this point have occurred with the angle of reflection equal to the angle of incidence. If the sound is incident on a surface that is rough and irregular (with the scale of roughness on the order of the wavelength of the sound), then the reflection can be correspondingly irregular or even random in direction. Thus, a sharply defined incident wave front can be reflected in a diffuse manner. Random scattering of ray 22, from irregular surface 24, is illustrated in FIG. 2.

There are a number of ways in which the scattering of waves can be controlled. As is well known to those versed in the art, a close analogy exists between acoustics and microwave technology such that almost any microwave guide system has an acoustical waveguide counterpart. Thus, it will be useful in the exposition of the invention to consider certain well-developed microwave guide systems as they relate to the controlled reflection of incident waves.

As is well known, communication satellites are required to reflect radio signals originating at the earth back to the earth. This requirement led to the invention of a device known as the "Van Atta reflector." The purpose of the Van Atta reflector is to reradiate microwave energy back in the direction of its arrival. A simplified form of the device is shown in FIG. 3 and comprises a six-element Van Atta reflector array 26 in a linear arrangement. Radiating elements 28-38, which are equidistant from the array center 40, are interconnected by transmission lines 42-46. In the example shown, the receiving end transmitting elements comprise conical horns 28-38, and the transmission lines 42-46 comprise cylindrical tubes. An incident plane wave front (indicated by line 48) with an angle of incidence O approaches the reflector array in the direction of arrows 50. At the time t=0, the wave front 48 reaches the entrance of horn 38; when t=5, the wave 48 would reach horn 28, where=(d/c) sin 0 (d is the interelement spacing, and c is the velocity of electromagnetic waves). Given that the time delay in each of the transmission lines 42-46 is equal to T, then the location of the reradiated wave front (moving in the direction of arrows 52) is shown at 48 for the time t=5+T. Horn 38 has just started to reradiate, while horn 28 already started to reradiate at time t=T. The contributions from all horns, therefore, create a planar wave front, wherein the energy is reradiated back along the original arrival path.

By analogy, the principles of the Van Atta reflector could be successfully employed in the retroreflection of unwanted sounds. The application of such a concept would, however, require extensive modification or adaptation of microwave structure to be suitable for sound waves and to provide a compact, readily fabricated article of manufacture.

The ability of a corner comprising the intersection of three mutually perpendicular planes to reflect a propagating wave back from whence it came has long been recognized. This principle has most commonly been utilized in light reflecting devices. The manner in which a corner reflector operates is shown schematically and two-dimensionally in FIG. 4. The corner comprises perpendicular walls 54 and 56. Ray 58 is shown approaching the corner parallel to the bisector 60 of the corner angle. After two specular reflections it proceeds in the opposite direction (as shown by arrow 62) still parallel to the corner angle bisector 60.

Ray 64 is shown approaching the corner at an angle of 45° to the corner angle bisector and thus approaching one of the sides of the corner at normal incidence. Ray 64 is also reflected back from whence it came by a specular reflection. It may readily be shown that for any angle of approach between that of ray 58 and ray 64, i.e., any ray which makes an angle of less than 45° with the corner bisector 60, such as ray 66, the ray is returned in the direction from whence it came.

For the case of angles of greater than 45° between the approaching ray and the corner bisector, a specular reflection does not reflect directly back to the source. The reflection, however, is generally back towards the source in the sense that the angle between the incident and reflected ray path is always less than the limiting value of 90°.

A comparison of a large, single element corner reflector with an acoustical Van Atta reflector of the same size has shown that the single element reflector is inferior to the Van Atta reflector in its ability to retroreflect sound precisely back towards its source, but the differences are relatively small and not at all critical for the present purposes.

In the present invention it has been discovered that an array of suitably nested corner reflectors can accomplish the desired retroreflection of unwanted sound. An array of nested corner reflectors in accordance with the present invention is far simpler to build than a Van Atta reflector array, yet yields highly satisfactory results.

Figure 5:
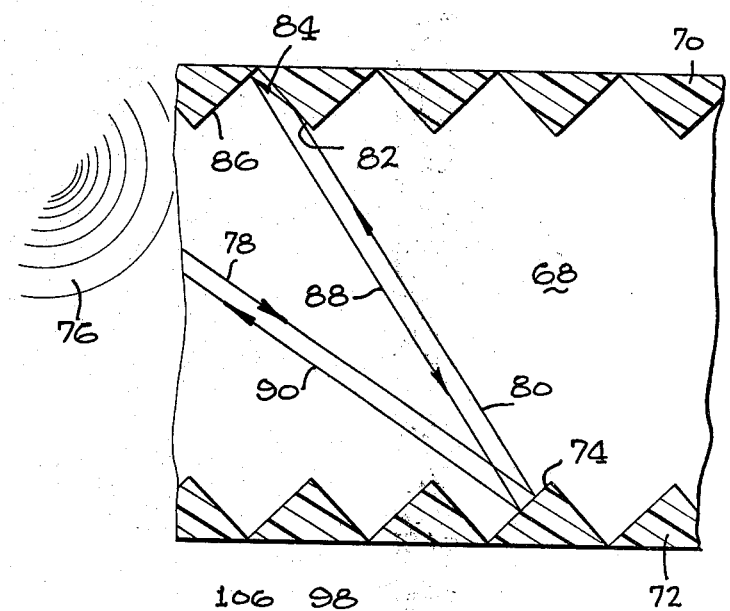
FIG. 5 is a somewhat diagrammatic cross-sectional, elevational view, of a first embodiment of the invention, as incorporated into a flow duct.

A typical application of the present invention relates to a sound impeding lining for a flow duct, such as may be employed in a heating or airconditioning system. There is shown in FIG. 5 a cross-sectional elevation view of a duct which may be of rectangular cross-section (similar to that of the embodiment shown in FIG. 7). The duct 68 is bounded on its upper and lower sides by wall members 70 and 72, respectively. The walls 70 and 72 have interior faces comprising a plurality of orthogonal reflectors, one of which is indicated at 74, the surfaces of which are disposed at 54° 40' angles to the planes of their respective exterior wall surfaces (70 and 72). The size or scale of these reflector surfaces 74 is determined by the wavelength of the sound of interest, and more specifically, the reflector surfaces must be large enough to reflect sounds in the range of interest. As is well known, the size of an effective reflector is directly proportional to the wavelength of the sound to be reflected and is of the order of one-quarter wavelength or greater.

The duct 68 may comprise an airconditioning duct, an aircraft engine exhaust duct, an auto exhaust duct, or the like, in which it is desired to control unwanted sound which would otherwise be propagated along the path of the duct. Desirable suppression of unwanted sound can often be accomplished if the sound is returned to its source, rather than be permitted to propagate away from the source and along the path of the duct. For example, sound from source 76 may be propagated along line 78 which indicates the path of the propagating wavefront. The source 76 may comprise a blower motor, fan, or other sound-generating device. The wavefront upon impinging upon reflective surface of reflector 74 would be reflected along path 80, since the angle of incidence equals the angle of reflection. Upon impinging on surface 82, the wavefront will thence proceed on path 84 to surface 86 whereupon it is reflected along path 88 back toward surface 74. Again, the angle of incidence at surface 74 equals the angle of reflection and the wavefront is returned along path 90 substantially the same path as path 78, towards source 76. Similar paths of propagation would result in substantially all of the waves from source 76 being returned by the corner reflectors 74 lining the walls of the duct 68.

There is shown in FIG. 6 a panel constructed to have formed therein a plurality of nested corner reflectors of the type described above. In a typical construction, the panel may be made by casting a suitable material such as plastic or ceramic against a suitable pattern or form. In spite of its complex appearance, the pattern may be readily generated in a solid block using linear milling machine cuts along lines parallel to three axes. The casting made against the pattern may then comprise the actual surface for linings of ducts or other structures used for the retroreflection of sound. Alternatively, the panel may be formed of sheet metal, plastic, or other sheet materials, in suitable dies.

Each functional element of the array comprises an orthogonal (pyramidal) corner structure, the outer boundary, or upper exposed edge, of which is contiguous with a like boundary segment of an adjacent corner element. A typical element or cell comprises intersecting planar, triangular wall members 90-94. The cell cavities are preferably at least one-quarter wavelength deep. The cavity depth is indicated by dimension 96 in FIG. 6. In a typical construction, a depth of approximately one inch would provide a cell which will begin working at about 3150 Hz and function well at all higher frequencies.

Figure 7:
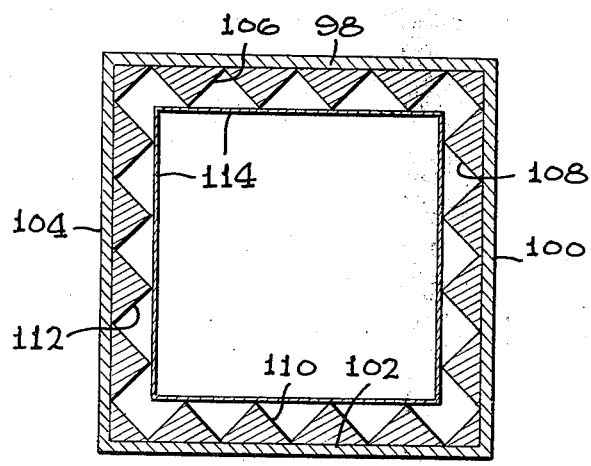
FIG. 7 is a cross-sectional, transverse view of a flow duct lined with a sound attenuator constructed in accordance with the invention.

There is shown in FIG. 7 a transverse cross-section of a rectangular duct comprising exterior walls 98-104. The length of the duct may be of any desired dimension. Each of the four walls 98-104 is lined with a reflector structure of the type shown in FIG. 6. The reflector structure may be fabricated by molding, casting, lay-up, or other suitable fabricating techniques. More particularly, the interior face of wall 98 is lined with the reflector array indicated at 106, walls 100-104 are similarly provided with reflector arrays 108-112, respectively. Insertion losses of the order of 10 decibels may be obtained with a reflector structure four duct widths long and one-quarter wavelength or more deep. This degree of attenuation is remarkable in view of the fact that no energy dissipating mechanism is present in the structure.

The apparatus of FIG. 7 is also shown to include as an alternate embodiment, a permeable facing sheet 114 over part or all of the exposed surfaces of the reflector arrays. This might be done, for example, to increase structural strength, aerodynamic smoothness, or to modify acoustical properties. In a typical construction, the facing sheet 114 may comprise a sheet of perforated metal or other sound permeable sheet material having the desired acoustical resistance. If the sheet is very permeable (resistance small), the behavior of its associated reflector array is essentially unchanged. If, however, the acoustical resistance of the permeable sheet 114 is large, the system acts more like a simple sound absorptive surface with normal reflection of unabsorbed energy and the backscattering effects decrease. Intermediate values of facing sheet resistance produce a mixed characteristic, partly retroreflective, partly absorptive, partly normally reflecting. Since the permeable facing sheet 114 may be used in conjunction with a simple array as shown in FIG. 6 to form acoustic panels, this provides an additional degree of flexibility for the acoustical designer. For example, in the design of auditoriums, music rooms, lecture halls, classrooms, and the like, great care should be taken to provide the proper amount of sound absorption in order to prevent the room from being too reverberant. At the same time care must be taken to avoid uneven distribution of the sound either by focusing effects which cause too much sound in some areas or dead spots where too little sound arrives. This is normally accomplished by diffusion of the reflected sound. One conventional way to attempt to diffuse the reflected sound is by the use of large surfaces of convex curvature along the walls of the room. By means of the present invention, provided with a properly chosen resistance facing, the needed absorption may be provided by a surface which also contributes to the diffusion of the sound because the unabsorbed portion is reflected partly in a specular manner and partly in a non-specular manner.

Another embodiment of the invention is illustrated in FIG. 8 which shows a cross-sectional, elevational view of a flow duct incorporating both a retroreflective liner and an absorptive liner. The incoming sound is partially attenuated by absorptive liner 116 and then retroreflected by the reflective structure 118, constructed as shown in FIG. 6, back to the absorptive liner 116, where it is further attenuated (as shown by the decreasing ray width) and reflected back from whence it came. The cooperation between the absorptive liner 116 and the reflective structure 118 has been shown to be highly effective, since the hybrid duct behaves essentially as though all surfaces were highly absorptive.

While the invention has been described in terms of its application to duct liners, it will be readily apparent to those versed in the art that the controlled backscattering reflector arrays of the invention may be applied to diverse other sound control applications. In addition to being formed from metal stamping or cast plastics, the reflective array may be fabricated from laminated fiberglass, or other materials which provide a relatively hard, smooth, sound-reflective surface. Thus, there is provided by the present invention a novel and improved structure for the controlled retroreflection of noise and other unwanted sounds.

INDUSTRIAL APPLICABILITY

The apparatus of the invention is useful for the control, attenuation or suppression of noise, particularly in airconditioning, heating or similar flow ducts, as well as for use under severe environmental conditions such as in a fanjet engine.

I claim:

1. An apparatus for the controlled retroreflection of sound comprising:
    a plurality of acoustical retroreflectors each having the form of a substantially orthogonal pyramidal cavity, the exposed surfaces of which have a dimension of the order of or greater than one-quarter of the wavelength of the sound to be controlled; and
    means for mounting said retroreflectors in a contiguous array for reception of an incident acoustical wavefront.

2. The apparatus of claim 1 wherein the typical depth of the cavities in said array is of the order of one-quarter of the wavelength of the sound which is to be controlled.

3. The apparatus of claim 1 wherein the open sides of said cavities lie substantially tangent to a common surface.

4. The apparatus of claim 1 wherein said array is fabricated from a unitary integral member.

5. The apparatus of claim 1 further including a sound permeable facing sheet extending over the sound receiving side of said cavities.

6. The apparatus of claim 5 in which the permeable facing sheet is substantially acoustically transparent.

7. The apparatus of claim 5 in which the permeable facing sheet provides an energy dissipating acoustical resistance.

8. An acoustical treatment for a passageway or duct comprising
    a plurality of acoustical retroreflectors each having the form of a substantially orthogonal pyramidal cavity and disposed in a contiguous surface array; and
    means for mounting said array on at least one interior wall of said passageway or duct.

9. The apparatus of claim 8 further including a sound permeable sheet extending over the sound receiving side of said array.

10. The apparatus of claim 9 in which the permeable sheet is substantially acoustically transparent.

11. The apparatus of claim 9 in which the permeable sheet is acoustically resistive.

12. The apparatus of claim 8 or 9 further including an absorptive liner mounted on an interior wall of said passageway or duct and positioned to receive sound reflected by said acoustical retroreflectors.

* * * * *